United States Patent [19]
Bewlay et al.

[11] Patent Number: 5,631,029
[45] Date of Patent: May 20, 1997

[54] MOULD FOR ISOSTATIC PRESSING

[75] Inventors: Bernard P. Bewlay; Dennis J. Dalpe, both of Schenectady, N.Y.

[73] Assignee: General Electric Company, Schenectady, N.Y.

[21] Appl. No.: 698,824

[22] Filed: Aug. 16, 1996

Related U.S. Application Data

[63] Continuation of Ser. No. 623,464, Mar. 28, 1996, abandoned, which is a continuation of Ser. No. 269,271, Jun. 30, 1994, abandoned.

[51] Int. Cl.$^6$ .................................................. B29C 43/00
[52] U.S. Cl. ....................... 425/78; 425/405.2; 425/436 R
[58] Field of Search ................................... 264/123, 313, 264/314, 570; 425/78, 405.1, 405.2, 406, 412, 416, 436 R, 444, DIG. 44

[56] References Cited

U.S. PATENT DOCUMENTS

| | | | |
|---|---|---|---|
| 2,558,823 | 7/1951 | Crowley et al. | 264/313 |
| 3,571,854 | 3/1971 | Lundstrom | 425/405.2 |
| 3,604,060 | 9/1971 | Lndstrom | 425/405.2 |
| 3,850,567 | 11/1974 | Heier | 425/405.1 |
| 3,907,949 | 9/1975 | Carlson | 264/313 |
| 4,330,251 | 5/1982 | Lebas et al. | 425/405.2 |
| 4,564,352 | 1/1986 | Pettersson | 425/405.2 |
| 4,604,252 | 8/1986 | Stigler | 264/313 |
| 4,934,919 | 6/1990 | Matsushita et al. | 425/405.2 |

FOREIGN PATENT DOCUMENTS

| | | | |
|---|---|---|---|
| 447207 | 10/1974 | U.S.S.R. | 425/405.2 |
| 912502 | 3/1982 | U.S.S.R. | 425/405.2 |
| 1533838 | 1/1990 | U.S.S.R. | 425/405.2 |

OTHER PUBLICATIONS

"Tooling for Cold Isostatic Pressing," KJ Morris, Isostatic Pressing Technology, edited by PJ James, Applied Science Publishers, New York, Chapter 4, pp. 91–119.

*Primary Examiner*—C. Scott Bushey
*Attorney, Agent, or Firm*—William H. Pittman

[57] ABSTRACT

An apparatus and a method for forming compacts having reduced elephant's feet effect is disclosed. The apparatus includes a press for dry bag isostatic pressing, the press body having a cavity with at least one open end formed therein, an elastic mould, operatively positioned inside the cavity for compacting metal powder, means, operatively connected to the mould for expanding the mould and compacting the metal powder, and at least one press member having a base section substantially normal to the cavity and an insert section extending from base section into the cavity, the insert section being formed in the shape of any one of a plurality of geometric shapes.

27 Claims, 3 Drawing Sheets

MOULD FOR ISOSTATIC PRESSING

This application is a Continuation of application Ser. No. 08/623,464 filed Mar. 28,1996 which is a Continuation of application Ser. No. 08/269,271, filed Jun. 30, 1994, both now abandoned.

BACKGROUND OF THE INVENTION

This invention generally relates to apparatuses for dry bag cold isostatic pressing, and more particularly to dry bag cold isostatic press moulds having improved punches for sealing the mould ends of such so as to reduce the elephant foot effect at the ends of the compact.

Metal powder, such as tungsten, is typically disposed in a cylindrical elastic mould and radially compacted. An apparatus for performing such radial compaction operations is well known in the art as a dry bag cold isostatic press. See "Isostatic Pressing Technology", edited by P. J. James, Applied Science Publishers, New York, Chapter 4, "Tooling for Cold Isostatic Pressing", pp. 91–119, incorporated herein by reference, dry bag cold isostatic pressing is sometimes herein referred to as dry bag pressing.

In dry bag pressing, an elastic bag or mould is fixed within a pressure vessel. The elastic mould has at least one open end which is sealed with the pressure vessel so that the fluid pressure medium within the vessel cannot enter the mould interior. The elastic mould is made from a material which does not chemically react with either the powder or the pressure medium, and readily releases from the powder compact. A material having a high resistance to wear from the powder is also desirable. Mould materials that can be used include natural rubber, neoprene, polyvinyl chloride, butyl, silicone, and preferably urethane.

In one method of dry bag pressing, a cylindrical elastic mould is used that is open at both ends, and has a void space, such as, for example, a cylindrical void therein. Sealing means for the open mould ends are provided by wear resistant metal punches. The punches are located and restrained by the yoke of the press, and guided into the bag by wear resistant bushes mounted in the pressure vessel. The top punch is removed and powder is charged into the void space in the mould completely filling the void space between the sealing means. The powder is charged into the mould by means well known in the art for providing a fill density that does not allow settling of the powder prior to compaction. A powder fill density of at least about 5 grams per cubic centimeter, and preferably about 6 grams per cubic centimeter is adequate. One method for providing such a fill density comprises pouring a small amount of powder in the mould followed by tamping of the powder, and repeating this procedure until the void space is filled.

The top punch is engaged in the mould and a fluid pressure medium is applied to the outside of the mould. The mould is supported by a metal cage or lantern ring which keeps the mould radially located, and distributes the fluid pressure medium evenly around the bag. A pressure of at least about 560 kg/cm$^2$, preferably at least about 1760 kg/cm$^2$, can be used to compact the powder, for example tungsten. Preferably, the radial pressure is applied for at least about 30 seconds to densify the powder to at least about 50 percent, preferably at least about 60 percent of theoretical density. Such compaction provides significant strength to the compact so that it can be easily handled and has sufficient structural strength to withstand the resistance sintering operation, without breakage.

The radial pressure applied to the mould by the fluid pressure medium is slowly removed in a controlled fashion to provide a controlled decompression of the compact. An uneven decompression of the compact may result in cracking or breakage of the compact. Pressure can be reduced at a rate up to about 70 kg/cm$^2$/second, preferably up to about 11 kg/cm$^2$/second to prevent such cracking or breakage of the compact.

The internal diameter of the void space in the mould is dependent upon the compaction ratio of the powder to be pressed. The compaction ratio and internal diameter are determined by means well known in the art to form a compact of the desired diameter. Such methods are described, for example, in "Tooling for Cold Isostatic Pressing" referenced above. For example, a tungsten compact of about 22 millimeters in diameter can be formed from a mould having an internal void space of 30.5 millimeters in diameter.

A tendency toward flaring of the ends of the formed compact has previously been minimized by careful adjustment of the inner surface profile in the mould. The punches sealing the ends of the cylindrical mould were provided to have a smaller diameter than the internal void space diameter of the cylindrical mould. The ends of the mould which seal around the punches are formed to correspond to the smaller diameter of the punches. The internal void space then has a small tapered section adjacent the punches tapering from the smaller diameter of the punches to the larger diameter of the void space.

The pressed compact is removed from the mould and sintered by resistance heating. As an example for tungsten, a resistance heating current of about 4,000 to 6,500 amps is transmitted through the compact according to cycles well known in the art. For example see "Application of Tungsten Wire as the Light Source in Incandescent Electric Lamps," D. J. Jones, Metallurgy and Material Technology, Volume 5 No. 10, pp. 503–512, 1973. Such resistance heating is sufficient to heat the compact to between about 2,100 and about 3,000° C. where the compact is sintered to about 85 percent of theoretical density. Other metals and ceramics compacts can be sintered by well known conventional methods.

However, solid rods of tungsten or other powder which are compacted by cold isostatic pressing typically have a cylindrical flared or "elephant's foot" region at each end due to friction between the punch and the powder. These elephant's feet have been found to generate significant yield reduction after either pressing or sintering; thus, indicating that "elephant's foot" is a major limitation in the efficient production of metal compacts by cold isostatic pressing.

Notwithstanding, the presentation of the art disclosed above, there continues to be a need for improved apparatus to eliminate or reduce cylindrical flared or "elephant's foot" regions at each end of powder, such as tungsten, compacted by cold isostatic pressing. Such apparatus desirably will provide increased product yield of both pressed and sintered articles while eliminating the need for the careful adjustment of the inner surface of the profile in the mould; would have a punch profiled in a geometric shape that would either eliminate or at least significantly reduce the elephant's foot region at least one end; would, in particular, reduce the diameter of at least one end region of the pressed compact during cold isostatic pressing; and would eliminate or at least significantly reduce the elephant's foot by having a taper applied at one or both ends of the cold isostatic pressed compact.

SUMMARY OF THE INVENTION

In carrying out the present invention in preferred forms thereof, we provide an apparatus for the cold isostatic press production of metal compacts, such as tungsten.

The present invention can be used to change the end geometry of articles produced by cold isostatic pressing from an axi-symmetric to a tapered form. This is accomplished by modification of the punches at one or both ends of the mould to any one of a plurality of geometric shapes such as, for example, a semi-circular notch or a tapered notch.

Each apparatus of the present invention includes an isostatic press for producing a cylindrical or otherwise shaped compact. The apparatus of the present invention includes a press which comprises a pressure vessel, a top and a bottom punch, an elastic mould bag, (a lantern ring), which keeps the mould bag radially located and distributes the fluid pressure evenly around the bag, an isostatic fluid port formed in the pressure vessel as well as a fluid bleed means. At each end of the apparatus are top and bottom members upon which the top and bottom punches are respectively operatively connected. The punches are modified to provide a surface contacting the pressed compact other than two surfaces perpendicular to the center line of the mould cavity so that elephant foot is eliminated on at least one side of one end of the resulting compact.

One specific press for cold isostatic pressing, according to the present invention, is a press comprising: a press body having a cavity with at least one open end formed therein; an elastic mould, operatively positioned in the cavity, for compacting metal powders; means, operatively connected to the elastic mould, for expanding the mould and compacting the metal powder; and at least one punch, having a base section normal to the cavity and an insert section, having one of a plurality of geometric shapes, extending from the base section into the cavity, for reducing flared ends of a compact formed thereby.

In one additional specific embodiment of the present invention, at least one punch has been formed as a semi-circular notch.

In another specific embodiment, at least one punch has been formed as a tapered notch.

Accordingly, an object of the present invention is to provide an apparatus for modification of at least one end of both solid rod and tubular articles produced by cold isostatic pressing utilizing a range of generated end geometries on one or both ends of the produced article in any orientation.

Another object of the present invention is to provide an apparatus for producing compacts by cold isostatic pressing having greater yields than those previously produced.

Still another object of the present invention is to provide an apparatus that reduces the end diameter of the end region of a compact manufactured by dry bag and wet bag cold isostatic pressing.

Other objects and advantages of the invention will be apparent from the following description, the accompanying drawings and the appended claims.

BRIEF DESCRIPTION OF THE DRAWINGS

FIG. 6a is a sectional view of a compact formed by the punch of FIG. 5a; and

DETAILED DESCRIPTION OF THE INVENTION

Production of metal compacts or ingots, such as tungsten with tapered ends by ram pressing of metal powder in steel dies is well established. The present invention is directed to an apparatus for making a compact or ingot having improved product yield of both pressed and sintered articles. The present invention includes an apparatus for modifying the end geometry of a compact and in particular, reducing the diameter of the end region of a pressed compact during dry bag and wet bag cold isostatic pressing. A taper can be applied to one or both ends of the compact. The principal advantage of the present invention is that it increases product yield.

Figure 1:
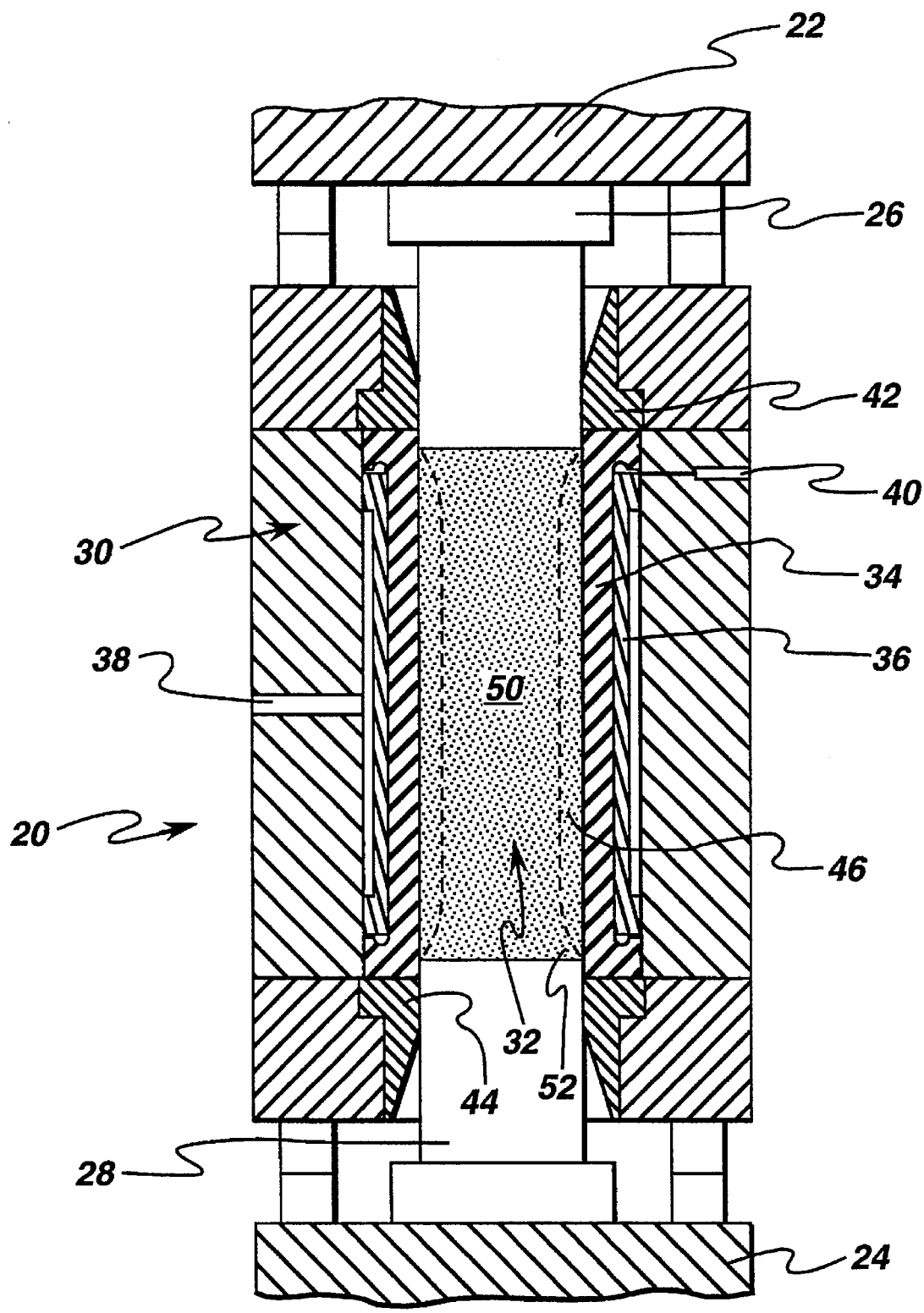
FIG. 1 is a partial sectional view of an illustrative dry bag tooling press.

The apparatus of the present invention, an improved dry bag tooling press, generally designated 20, is illustrated in FIG. 1. The press 20 comprises a top press member 22, a bottom press member 24, a top punch 26 and a bottom punch 28, which are operatively connected to the respective top 22 and bottom 24 press members. The press body 30 has a cavity 32 formed therein which may be in any desired geometrical shape. The interior walls of the body 30 consists of a mould bag 34. Between the press body 30 and the mould bag 34 is a lantern ring 36. Formed in the press body 30 is an isostatic fluid port 38 and a bleed screw 40. At each end of the cavity are bushings 42 and 44, respectively. The press 20 operates in a conventionally known manner.

Also shown in FIG. 1 inside the cavity 32 is the uncompressed metal powder 46 and the compressed compact 50 (shown in dotted lines) after the application of pressure and the completion of the isostatic pressing cycle. The "elephant's foot" or flaring at each end 52 is clearly illustrated in FIG. 1.

Figure 2A:
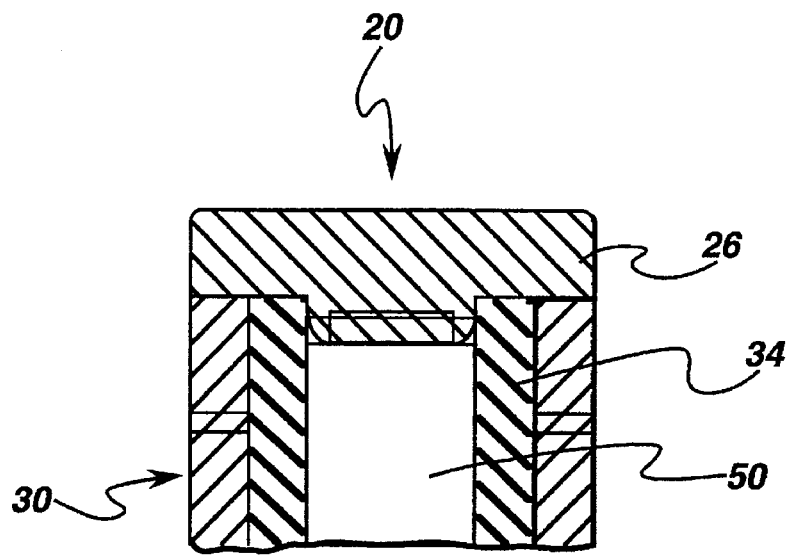
FIG. 2a is a sectional view of the press of FIG. 1 showing the press closed and the bag deformed to produce a compact or ingot.
Figure 2B:
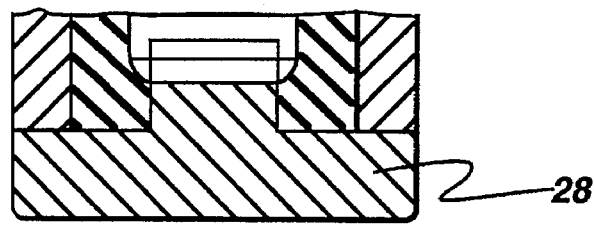
FIG. 2b is a partial sectional view of FIG. 2 showing a prior art method of eliminating the elephant's foot effect.

FIG. 2a shows the mould bag in its deformed condition applying pressure on the metal particles to form the compact. The prior art apparatus and method of eliminating the "elephant's foot" or flaring by careful reconfiguring of the internal mould bag so that a compact ingot is produced without the "elephant's foot" is illustrated in FIG. 2b.

Figure 3:
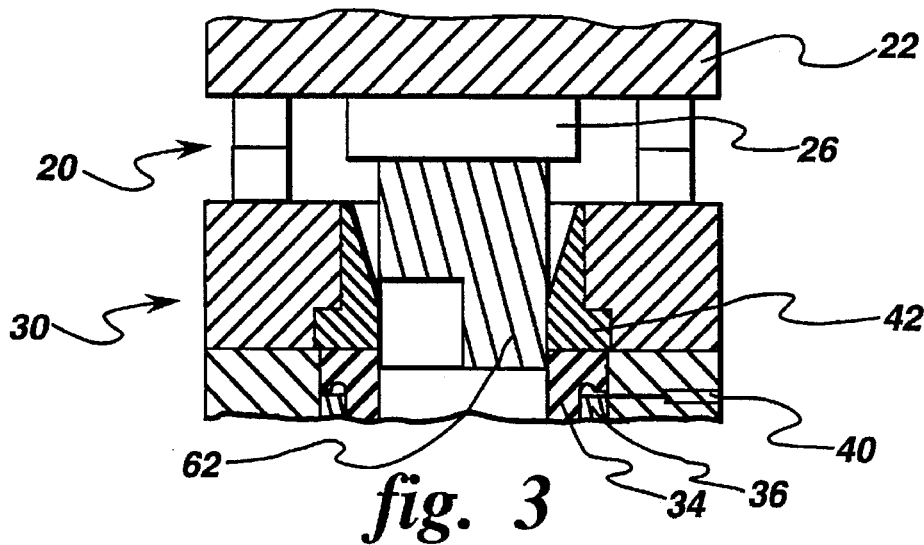
FIG. 3 is a partial sectional view of the top press member of the present invention having a modified punch member.
Figure 4:
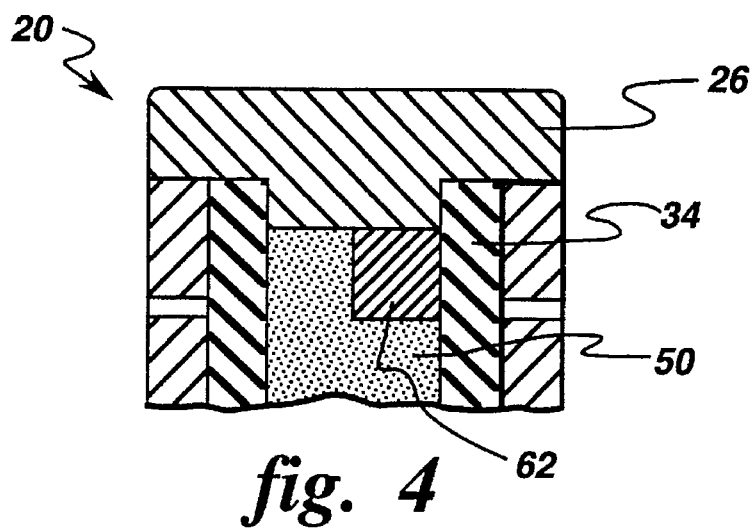
FIG. 4 is a partial sectional view showing the illustrated modified punch of FIG. 3 positioned inside deformed press cavity.
Figure 6A:
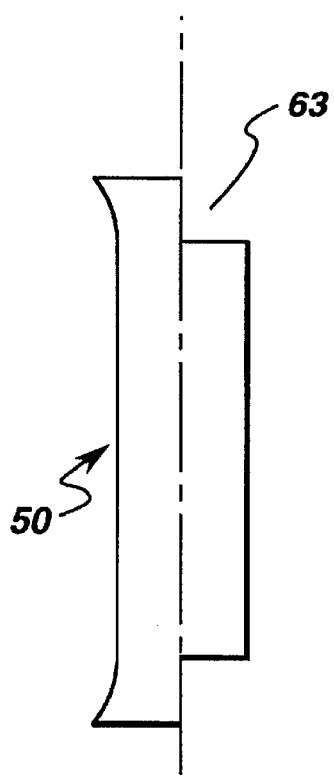

FIG. 3 shows a modified top punch 26 positioned in the upper portion of the press 20 of FIG. 1. As clearly illustrated, top punch 26 includes an extension 62 which, as shown in FIG. 4b, eliminates the elephant's foot on that particular side thereof. By imparting a notch 63 in the compact 50, the elephant's foot has been eliminated on the one side, as shown in FIG. 6a.

Figure 5A:
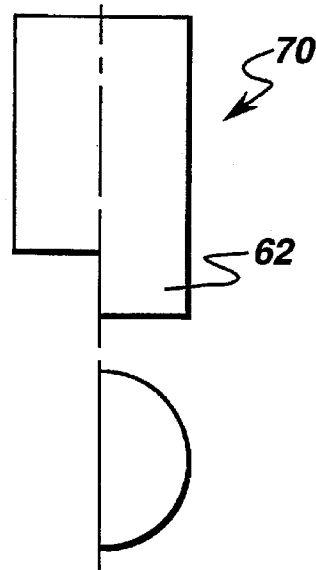
FIG. 5a is a sectional view of a semi-circular punch as used with the apparatus of the present invention.
Figure 5B:
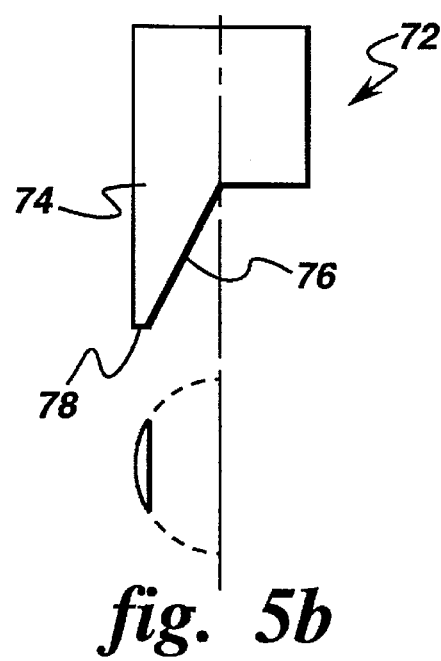
FIG. 5b is a sectional view of a tapered punch as utilized with the apparatus of the present invention.

FIGS. 5a and 5b, illustrate representative punches 70 and 72. The semi-circular punch 70 has an extension 62 which can extend for at least about one-fifth of the length of the overall punch which enters into the cavity 32.

Figure 6B:
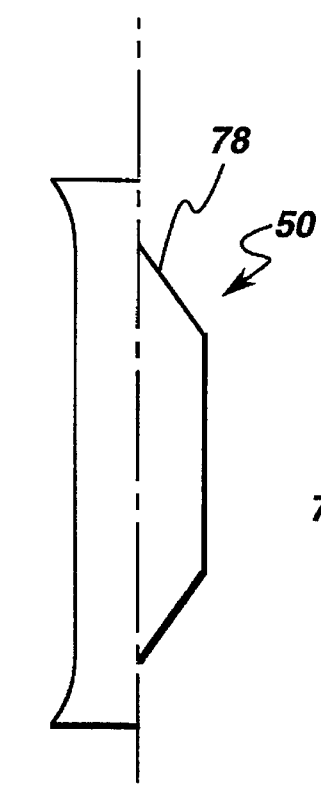
FIG. 6b is a sectional view of a compact formed by the punch of FIG. 5b.

FIG. 5b illustrates a tapered punch 72 having an extended portion 74 with a depth of approximately half of the overall length of the die portion which extends into the cavity 32. As shown, the angle of wall 76 is about 26 degrees, but an acceptable angle could be from about 5 to about 82 degrees and the length of end 78 is about 0.174 the width of the punch 72 but an acceptable length could be from about 0.001 to about 0.25 the width of the punch 72. By imparting the taper 78 in the compact 50, as shown in FIG. 6b, once again the elephant's foot has been eliminated on the one side.

The apparatus of the present invention will be better understood by referring to the following examples.

EXAMPLE I

In one application of the apparatus of the present invention, a charge of 1450 g of tungsten powder with a mean particle size of 4.5 μm was poured into a flexible tubular urethane mould which had been sealed previously at the bottom with a steel punch of the design shown in FIG. 5a. The urethane mould had previously been fixed in a dry bag cold isostatic press. The mould had an internal diameter of 23 mm and an internal length of 660 mm. The top of the mould was sealed with a punch of a similar design after powder filling. The mould can be filled with powder either manually or automatically or is known in the art.

A pressure of 170 Mpa was applied to the mould using hydraulic fluid, held for 60 seconds, and then released. After decompression, the pressed tungsten compact or ingot was removed from the mould. The mean diameter of the pressed rod was 15.6 mm, neglecting the bottom and top 50 mm of the ingot. Each end was tapered in a manner controlled by the profile of each punch, as shown in FIG. 5a.

The ingot can then be sintered directly by self-resistance heating, or indirectly in a furnace. The punch material which is used to modify the ingot end can be either steel or urethane. Urethane has the advantage of preserving the isostatic mode of compaction in the end regions of the ingot but has the disadvantage of making decompression slower and control more difficult.

In another mode of operation, a similar procedure to that of Example I was used together with tungsten powder with a mean particle size of 1.9 μm. The mean diameter of the ingot pressed at 170 Mpa was 13.5 mm and each end was tapered in a similar manner to the ingot shown in FIG. 6b utilizing the punch of FIG. 5b. It is believed that ingots with end tapers can be pressed in this manner from such powder using pressures between about 20 and about 211Mpa.

EXAMPLE II

In an additional example of the apparatus of the present invention, ingots were pressed with notched ends using the punches shown in FIG. 5a. The notched end 62 of the ingot occupied between 5 and 60% of the diameter of the punch 70. In one mode, a punch which had a notch 62 13 mm deep and 50% of the cross sectional area of the ingot was used. The ingot was pressed from 4.5 μm powder using the procedure described earlier with a pressure of about 170Mpa.

The resulting ingot is illustrated in FIG. 6a. The length of the notch 63 can be from 1% to 10% of the length of the ingot. The notch can be pressed into one or both ends of the ingot. The semicircular notches can be pressed so that they are parallel with, perpendicular to and in any orientation with respect to each other. Generally, the notches are disposed 180° with respect to each other on the opposite ends.

Ingot end modification helps to reduce end losses during further processing. For example, ingot end tapering is particularly valuable for self resistance sintering where water cooled electrodes are attached to the ingot ends. The cooling effect of the electrodes reduces sintering at the ingot ends. Reduction in the cross sectional area can be used to increase the local current density and therefore the rate of heat input to the end of the ingot and thereby overcome the cooling effect of the electrodes. In this manner, more uniform sintering is generated along the full length of the ingot. The apparatus of the present invention provided a flat surface pressed onto the end of the ingot. This flat surface aids the application of electrodes to the ingot for self resistance sintering.

The apparatus and method of the present invention can be used for a range of powders including both metallic powders, such as, for example, tungsten, tantalum, molybdenum, and copper, as well as ceramic powders such as for example, alumina, zirconia and yttria.

While the apparatus herein described constitute preferred embodiments of the invention, it is to be understood that the invention is not limited to these precise apparatus and that changes may be made therein without departing from the scope of the invention which is defined in the appended claims.

What is claimed is:

1. A cold isostatic press comprising:
   a press body having a cavity with at least one open end formed therein;
   an elastic mould, operatively positioned in the cavity, for compacting metal powder;
   means, operatively connected to the mould, for expanding the mould and compacting the metal powder; and
   at least one punch having a base section normal to the cavity and having an extension, the extension having any one of a plurality of geometric shapes and having a surface contacting the metal powder, with the surface having first and second portions substantially normal to the cavity, and with the first portion extending further into the cavity than the second portion for reducing flared ends of a compact formed in the press.

2. The press of claim 1, wherein the geometric shape of the extension is semi-circular.

3. The press of claim 2, wherein the semi-circular extension is about one-fifth of the length of the overall punch.

4. The press of claim 1, wherein the geometric shape of the extension is tapered.

5. The press of claim 4, wherein the tapered portion of the extension has a length of approximately one-half of the overall length of the punch.

6. The press of claim 2, wherein the angle between a surface of the semi-circular extension and the center line of the punch is from about 5 to about 89 degrees.

7. The press of claim 2, wherein the angle between the surface of the semi-circular extension and the center line of the punch is about 26 degrees.

8. The press of claim 5, wherein the length of the tapered end of the extension is about 0.001 to about 0.25 the width of the punch.

9. The press of claim 5, wherein the length of the tapered end of the is about 0.174 the width of the punch.

10. A cold isostatic press having a mould for forming a metal compact in a cavity thereof, the press having at least one open end, the press comprising:
    means for depositing a metal powder in the cavity;
    at least one punch having a base section substantially normal to the cavity and having an extension, the extension having any one of a plurality of geometric shapes and having a surface contacting the metal powder, with the surface having first and second portions substantially normal to the cavity than the second portion extending further into the cavity than the second portion for sealing at least one end of the cavity;

means, operatively connected to the mould, for applying pressure to the outer surface of the mould; and means, operatively connected to the mould, for decompressing the mould by reducing the pressure such that the resulting compact has a taper applied to at least one end thereof thereby eliminating elephant's foot on the tapered end.

11. The press of claim 10 further comprising:

means for removing the resulting compact from the press.

12. The press of claim 10 wherein the cavity has two open ends and two punches having any one of a plurality of geometric shapes.

13. The press of claim 10 wherein the portion of the punch which extends further into the cavity extension has a semi-circular shape.

14. The press of claim 10, wherein the portion of the punch which extends further into the cavity extension has a tapered shape.

15. A press for forming a metal compact in a cold isostatic press having a cavity and two open ends comprising:

means for depositing a metal powder in the cavity;

a punch having a base section substantially normal to the cavity and having an extension, such extension having any one of a plurality of geometric shapes formed thereon and having a surface contacting the metal powder, with the surface having first and second portions substantially normal to the cavity, and with the first portion extending further into the cavity than the second portion, for sealing each end of the cavity;

means, operatively connected to a mould, for applying pressure to the outer surface of the mould; and means, operatively connected to the mould, for decompressing the mould by reducing the pressure such that the resulting compact has a taper applied to each end thereof thereby eliminating elephant's foot on each end.

16. The press of claim 15 further comprising:

means for removing the resulting compact from the press.

17. The press of claim 15 wherein at least one of the portion of the punch extension which extends further into the cavity has a semi-circular shape.

18. The press of claim 15, wherein at least one of the portion of the punch extension which extends further into the cavity punch extension has a tapered shape.

19. A system for forming a metal compact in a cold isostatic press having a cavity and at least one open end comprising:

means for depositing a metal powder in the cavity of the cold isostatic press;

means for sealing at least one end of the cavity with a punch having a base section substantially normal to the cavity and having an insert section, the insert section having any one of a plurality of geometric shapes, extending from the base section into the cavity, and having a surface contacting the metal powder, with the surface having first and second portions substantially normal to the cavity, and with the first portion extending further into the cavity than the second portion;

means for applying pressure to the outer surface of a mould; and means for decompressing the mould by reducing the pressure such that the resulting compact has a taper applied to at least one end thereof thereby eliminating elephant's foot on the tapered end.

20. The system of claim 19 further comprising:

means for removing the resulting compact from the press.

21. The system of claim 19 wherein the press has a cavity having two open ends and the sealing means comprises two punches having any one of a plurality of geometric shapes.

22. The system of claim 19 wherein the insert section extending from the base section has a semi-circular shape.

23. The system of claim 19 wherein the insert section extending from the base section has a tapered shape.

24. A system for forming a metal compact in a cold isostatic press having a cavity and two open ends comprising:

means for depositing a metal powder in the cavity of the cold isostatic press;

means for sealing each end of the cavity with a punch having a base section substantially normal to the cavity and having an insert section, each insert section having any one of a plurality of geometric shapes, extending from the base section into the cavity, and having a surface contacting the metal powder, with the surface having first and second portions substantially normal to the cavity, and with the first portion extending further into the cavity than the second portion;

means for applying pressure to the outer surface of a mould; and means for decompressing the mould by reducing the pressure such that the resulting compact has a taper applied to each end thereof thereby eliminating elephant's foot on each end.

25. The system of claim 24 further comprising:

means for removing the resulting compact from the press.

26. The system of claim 24 wherein at least one punch extension has a semi-circular shape.

27. The system of claim 24, wherein at least one punch extension has a tapered shape.

* * * * *